(No Model.)
W. S. McCORD.
HARROW.
No. 427,353. Patented May 6, 1890.
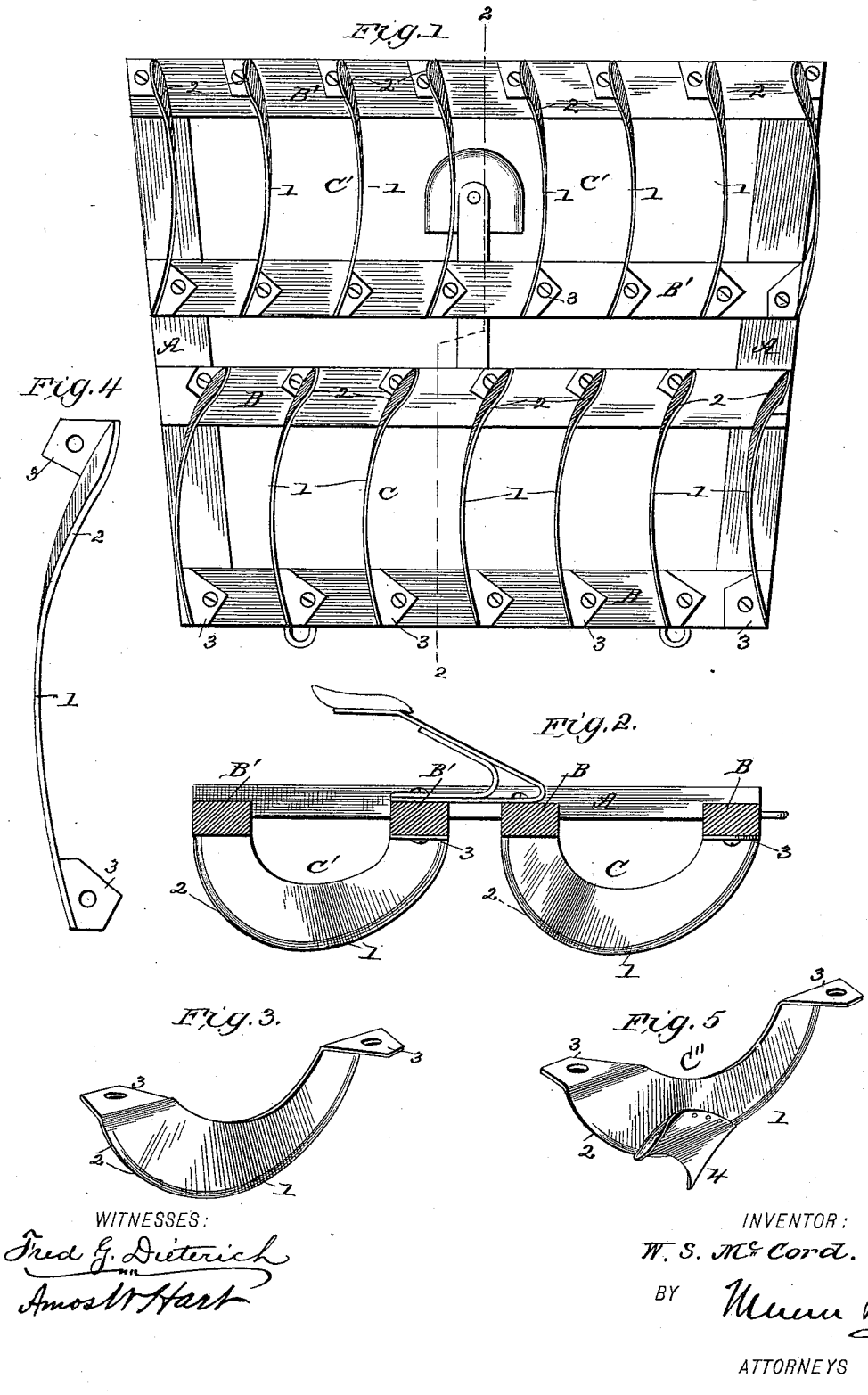
WITNESSES:
Fred G. Dieterich
Amos W. Hart
INVENTOR:
W. S. McCord.
BY Munn & Co.
ATTORNEYS

UNITED STATES PATENT OFFICE.

WILLIAM S. McCORD, OF GRATZ, KENTUCKY.

HARROW.

SPECIFICATION forming part of Letters Patent No. 427,353, dated May 6, 1890.

Application filed December 14, 1889. Serial No. 333,806. (No model.)

*To all whom it may concern:*

Be it known that I, WILLIAM S. MCCORD, of Gratz, in the county of Owen and State of Kentucky, have invented a new and useful Improvement in Harrows, of which the following is a specification.

My invention is an improvement in the class of harrows or soil-pulverizers having a series of convex-edged cutting-blades instead of teeth.

My improvement consists in the form and arrangement of the blades or cutters, whereby they are adapted to cut, pulverize, and turn the soil in a superior manner, as hereinafter set forth.

In the accompanying drawings, Figure 1 is a bottom plan view of the harrow. Fig. 2 is a longitudinal section on line 2 2, Fig. 1. Fig. 3 is a perspective view of one of the blades. Fig. 4 is a plan or edge view of one of the blades enlarged. Fig. 5 is a perspective view of a modification.

The wooden frame of the harrow is slightly narrower at the front end. It is composed of the two side bars A A, which are placed at a slight angle to each other, and two pairs of parallel cross-bars B B and B B', all bolted rigidly together. There are two sets of blades or cutters, the front set C being attached to the cross-bars B B and the rear set C' to the other cross-bars B' B'. The blades are formed, preferably, from thin plates of steel and arranged parallel. Their lower or cutting edges 1 are convex or curved from end to end and beveled or sharpened to enable them to cut into the soil to the required depth. The curvature or convexity of the blades may be regular or conformable to the arc of a circle; but I prefer an irregular curvature, as shown, the point of greatest convexity 1 being farther from the front end of the blades, the intervening portion being longer and of less curvature than the portion in rear of such point 1. Each blade has a general curvature in a lengthwise direction, as best shown in Fig. 4—that is to say, it is curved regularly, or nearly so, from end to end—and its rear end 2 is also bent or twisted laterally out of the line of general curvature. It will be observed (see Fig. 1) that the blades of each set are arranged parallel to each other, but that those of one set are so arranged as to curve in the opposite direction to those of the other set. The blades of each set are placed, in practice, about six to eight inches apart, and the rear ones C' are placed opposite the spaces between the forward blades C, so as to enter and work the portions of the soil left untouched by the front ones.

To adapt the blades for attachment to the frame, the ends 3 of each one are bent or turned laterally in opposite directions at right angles to its general plane and provided with holes to receive screws or bolts, as shown. In practical operation, as the harrow is drawn over the soil the blades cut into it and also push laterally and turn over the portions with which their concave sides work in contact, the rear blades C' acting on the portions of the soil not worked by the forward blades C, and pushing and turning over the same in the opposite direction, and thereby cutting up and working the entire surface. The convexity and general longitudinal curvature of the blades enable them to enter the soil and work it laterally; but the short rear twist 2 is requisite for turning it over, as before described. This construction and operation particularly adapt the harrow for covering wheat, rye, oats, or other small grain; but for the best effect the team should be driven at moderate speed. The same curvature and twist also adapt the blades to scour themselves clean and bright in a short time.

The harrow is specially adapted for pulverizing ordinary soil or "old ground," thus putting it in the best condition for planting tobacco and some other crops without necessitating the preliminary use of a plow; but for the best effect in such a case the soil should be cross-harrowed. The harrow also operates with great power on the ridges or upturned slices of new-plowed land, cutting into and breaking up and pulverizing the same in a superior manner.

The harrow will not choke or clog in soil bearing much grass or many weeds, but uproots, dislodges, and exposes them to the sun. The blades enter the soil to a depth of four to six inches. The draft is, however, light as compared with the effect produced on the soil.

The harrow can be converted into a cultivator for corn, cotton, or tobacco by detaching the blades C C' and substituting the one C'', shown in Fig. 5. A curved wing 4 is riveted to the side of such blade and has a point that projects a considerable distance below the edge of the blade. The use of the wing 4 is to throw the soil laterally up to and around the stalks of the corn, cotton, or tobacco. One blade C'' is used on the right side and another on the left side of the frame A. Fig. 5 shows a blade adapted to be placed on the left side of the frame, so that its wing 4 may throw the soil inward toward the row of plants straddled by said frame.

What I claim is—

1. A harrow composed of a suitable frame and two sets of vertical parallel cutting-blades placed one behind the other, each blade having a convex edge and curved longitudinally, those of one set being curved oppositely to the other, and each blade of the rear set being placed opposite a vacant or intervening space of the front set, substantially as shown and described.

2. In a harrow, a series of parallel blades having a convex edge, and a continuous curve in one direction or longitudinally from one extremity to the other, as shown and described.

WILLIAM S. McCORD.

Witnesses:
J. W. ST. CLAIR,
WM. R. MINISH.